Aug. 24, 1948.                M. H. GARFUNKLE                2,447,938
                         SUPPORT FOR PORTABLE FIRE BASKETS
Filed March 24, 1944                                    3 Sheets-Sheet 1
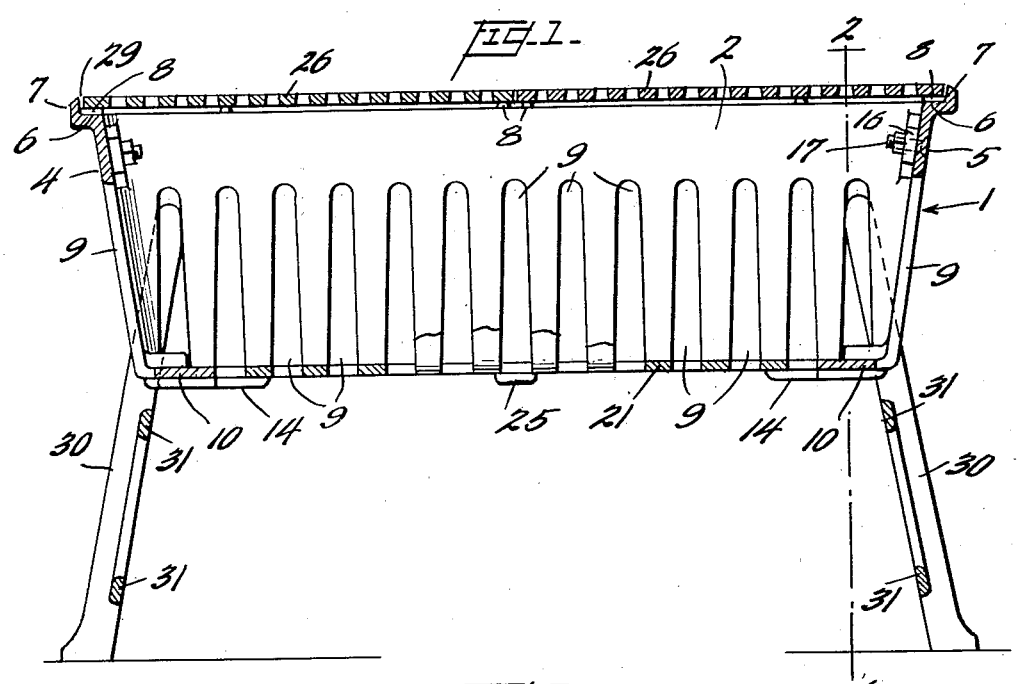
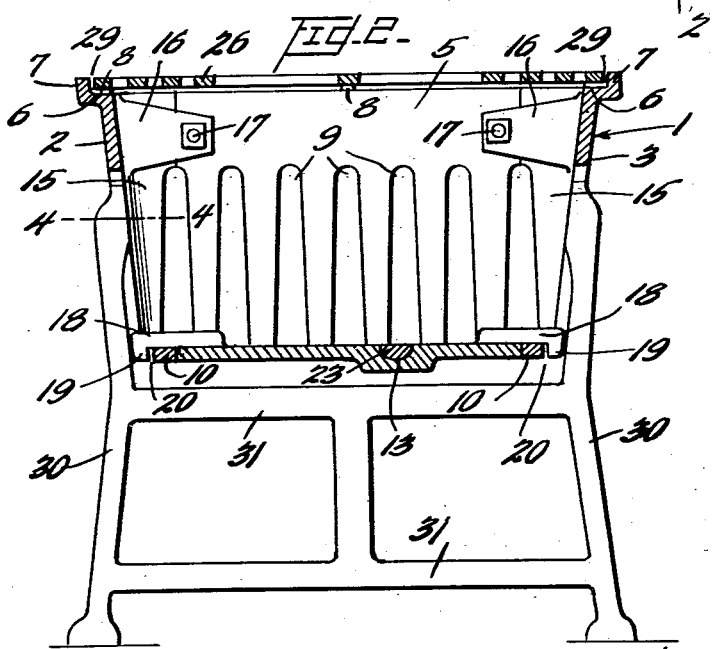
Inventor:-
Morris H. Garfunkle,
By:- Smith, Michael & Gardiner,
Attorneys Aug. 24, 1948.  M. H. GARFUNKLE  2,447,938
SUPPORT FOR PORTABLE FIRE BASKETS
Filed March 24, 1944  3 Sheets-Sheet 2
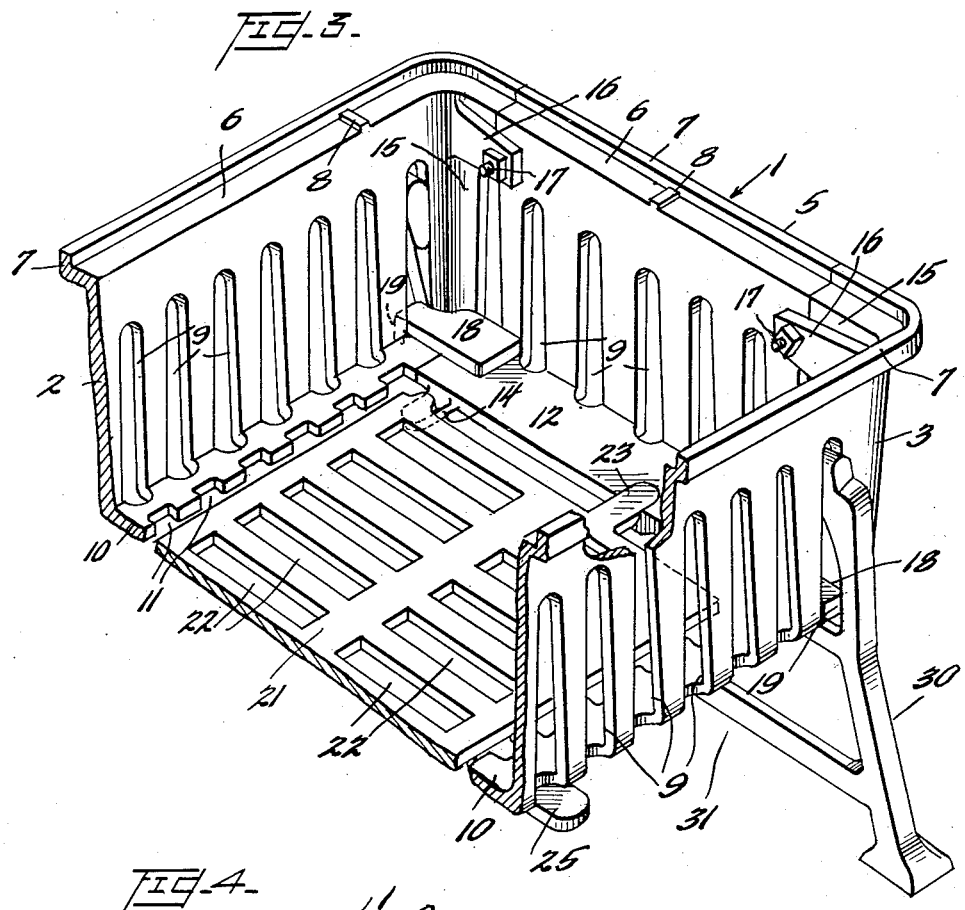
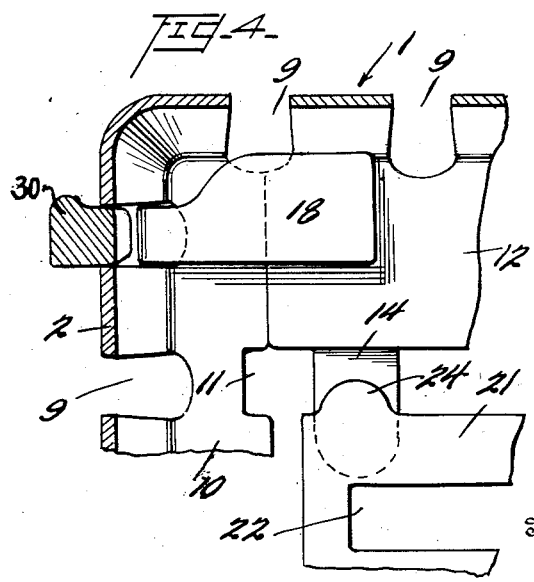
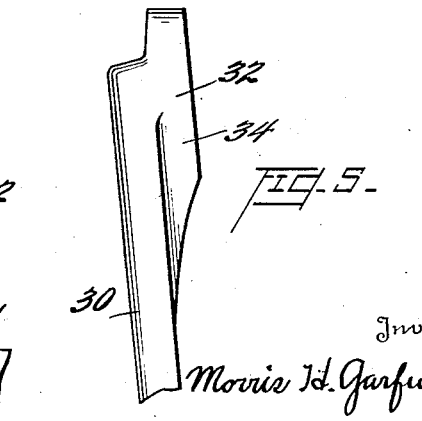
Inventor:-
Morris H. Garfunkle,
By Smith, Michael and Gardiner,
Attorneys.

Aug. 24, 1948.  M. H. GARFUNKLE  2,447,938
SUPPORT FOR PORTABLE FIRE BASKETS
Filed March 24, 1944  3 Sheets-Sheet 3
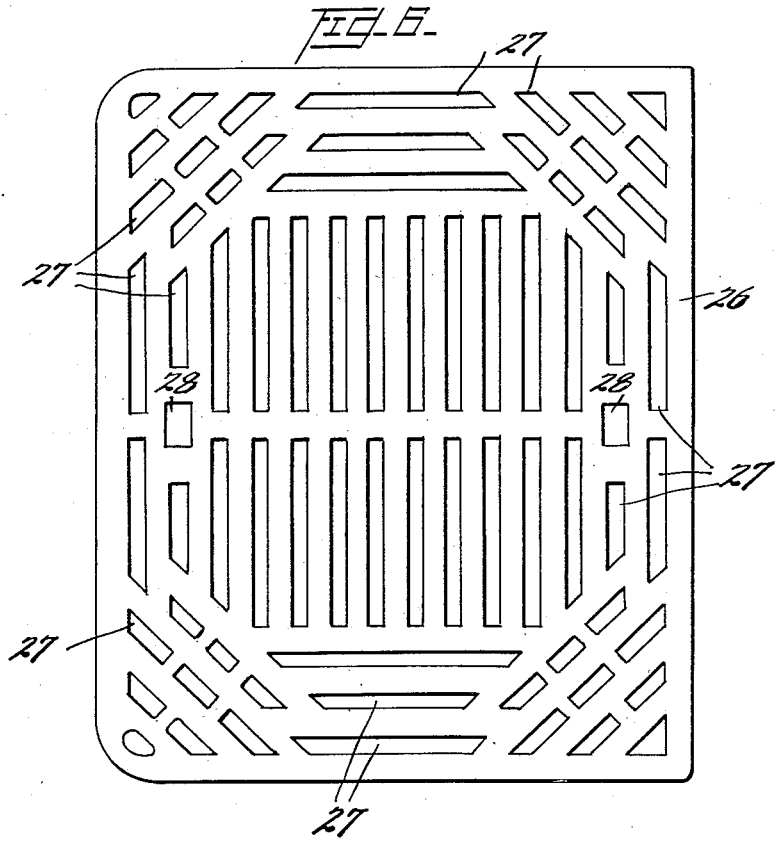
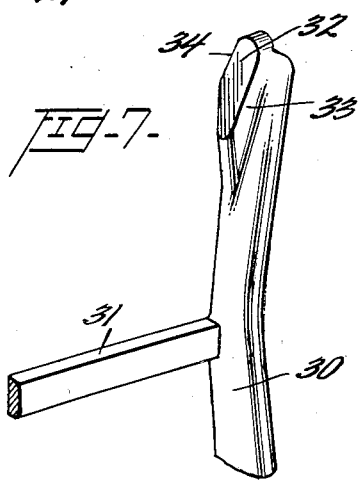
Inventor:
Morris H. Garfunkle,
By: Smith, Michael & Gardiner,
Attorneys.

Patented Aug. 24, 1948

2,447,938

UNITED STATES PATENT OFFICE 2,447,938

SUPPORT FOR PORTABLE FIRE BASKETS

Morris H. Garfunkle, Newark, N. J.

Application March 24, 1944, Serial No. 527,935

8 Claims. (Cl. 248—165)

1

My invention relates to a portable fire basket, and has particular reference to a fire basket primarily intended for use in fireplaces, or as a field or camp stove, for heating and/or cooking purposes.

It is an object of my invention to provide a portable fire basket composed of a plurality of individual sections which may be readily manufactured, shipped, assembled and readily secured together to form a complete and efficient fire basket.

It is an object of my invention to provide a portable fire basket composed of a plurality of individual sections, and to provide novel means by which said sections may be assembled and secured together, and wherein the fastening means are such that the sections and fastening means are not subjected to undue strains and breakage as the sections expand and contract when subjected to varying degrees of temperature.

It is an object of my invention to provide a portable fire basket having detachable leg portions which may be readily attached to and removed from the body portion of the basket to support the basket in spaced relation above the hearth or other surface, and which legs may be attached to and removed from the body of the basket without the use of bolts, screws or like fastening means.

It is an object of my invention to provide a portable fire basket having a novel grate structure by which ashes or other contents of the basket may be readily dumped by manipulation of the grate from the outside or exterior of the basket and without the employment of special tools or the like.

It is a further object of my invention to provide a portable fire basket having a novel top or cover portion adapted to support cooking utensils when the basket is used for cooking purposes, which top or cover is suitably spaced from the top of the basket to permit grease or other liquids to pass beneath the top or cover and into the fire within the basket to thus maintain the outer surface of the basket in a clean and sanitary condition.

It is a still further object of my invention to provide a portable fire basket which is simple and economical in construction, is readily assembled and disassembled, is rigidly supported on strong, readily detachable legs, and which is otherwise highly satisfactory and efficient in the purposes for which designed.

In the accompanying drawings wherein I have

2 shown a preferred embodiment of my invention,

Fig. 1 is a vertical, longitudinal sectional view through a preferred form of my improved portable fire basket, Fig. 2 is a vertical sectional view on the line 2—2 of Fig. 1, Fig. 3 is a fragmentary perspective view of an end portion of my improved portable fire basket shown in Figs. 1 and 2, Fig. 4 is an enlarged fragmentary, longitudinal sectional view on the line 4—4 of Fig. 2, Fig. 5 is a fragmentary view of the upper portion of one of the detachable legs utilized to support the portable fire basket in spaced relation above a hearth or other surface, Fig. 6 is a plan view of one of the sections of the two-part top or cover adapted to be placed on the portable fire basket of my present invention when the same is to be used for cooking purposes, and Fig. 7 is a fragmentary perspective view of a portion of one of the detachable legs.

Referring to the accompanying drawings, wherein like reference numerals have been employed to designate like parts throughout the several views, the numeral 1 designates, broadly, the novel basket or body portion of my present invention, which, in the present instance, comprises rear and front sections 2 and 3, respectively, and end sections 4 and 5. The upper edge of each of the sections 2 to 5, inclusive, is provided with a channel 6 formed by the laterally and outwardly extending flange 7 at the top of each section, suitable lugs or projections 8 being provided at spaced intervals throughout the length of this channel for a purpose to be hereinafter described.

Each of the sections 2 to 5, inclusive, is provided with spaced, vertically-extending cut-out portions 9, as is customary in fireplace grates or fire baskets and similar devices, for permitting air to circulate to and through the fire bed within the grate or basket, these cut-out portions terminating at their upper ends in spaced relation to the top portion of each section and extending to the bottom of each of the rear and front sections 2 and 3, respectively, and horizontally for a short distance along an inturned flange 10 located at the bottom of each of said sections 2 and 3, which flanges 10 are notched, as at 11, along their inturned marginal edges, the cut-out portions 9 in end sections 4 and 5 also extending horizontally for a short distance along an inturned flange 12 provided at the bottom of each of said sections, which flanges 12 are provided with aligned, elongated, semi-cylindrical depressions 13 (Fig. 2) positioned on the upper surface of each flange 12 and toward the front of the basket as viewed in Figs. 2 and 3, i. e., these depressions 13 in the two flanges 12 at opposite ends of the basket are in horizontal alignment and are located in a plane closer to the front 3 of the basket than to the rear 2 thereof. Each flange 12 is also provided with an inwardly extending lug 14 extending from the lower surface of the flange and located near the end of the flange which is adjacent the rear section 2 of the basket.

The rear and front sections 2 and 3, respectively, extend throughout the entire length of the basket and terminate at each end in integral, inturned portions 15 which, when the basket is assembled, constitute a part or portion of the ends thereof, as clearly illustrated in Fig. 3. As a preferred means for attaching the several sections 2, 3, 4 and 5 of the basket together, I provide near the upper end of each inturned portion 15, a lug 16 which projects beyond the portion 15 and which is provided with an aperture near its projecting end. Each of the end sections 4 and 5 is provided with an aperture, which apertures are in alignment with the apertures in the lugs 16 when the sections of the basket are assembled, whereby suitable stove bolts or the like 17 may be passed through the apertures in the end sections and through the apertures in lugs 16 to secure the upper portions of the basket together, all as clearly illustrated in Figs. 2 and 3 of the accompanying drawings.

As a preferred means for securing the lower portions of the sections 2, 3, 4 and 5 together, I provide the opposite ends of each of the flanges 12 of end sections 4 and 5 with a lug 18, each of which lugs extends above and beyond the adjacent end of the flange 12 and terminates in a depending end or hook-like portion 19 as best seen in Fig. 2 of the accompanying drawings. As shown, each lug 18 is adapted to pass through opposed cut-out portions 9 near the ends of the rear and front sections 2 and 3, respectively, and to overlie the inturned flange 10 of each of said sections, it being noted that the depending end portion 19 of each lug 18 is disposed within the horizontal portion at the lower end of said cut-out portions 9 and hooks behind the outer edge of the underlying portion of the flange 10. Preferably, the distance between the inner surface of the depending portion 19 of each lug 18 and the adjacent end of the flange 12 is slightly greater than the width of the flange 10 where it underlies said lug 18, so that there is a space 20 between said surface and the outer edge of the flange 10 whereby the parts of the assembled fire basket may expand and contract due to temperature variations to which it is subjected without imposing undue strains upon the component parts of the basket or upon the means utilized for securing the parts in assembled relation.

The fuel-supporting or grate portion of the portable fire basket of my present invention comprises a flat, grate-like structure 21 provided with a double row of spaced openings or cut-out portions 22 through which air may circulate from beneath the fire basket to effect combustion of solid fuel such as wood, coal, coke or the like placed within the basket or body portion 1. Opposite ends of the grate-like structure are provided with outwardly-projecting trunnions 23 shaped and dimensioned to conform to, and to be received within, the depressions 13 of flanges 12, it being noted from the disclosures of Figs. 2 and 3 of the accompanying drawings that these trunnions are located toward the front section 3 of the fire basket 1 so that the preponderance of weight of the grate-like structure 21 is to the rear of said trunnions. Outwardly extending lugs 24 are provided at each of the rear corners of the grate-like structure 21 and extend toward the adjacent flanges 12 on end sections 4 and 5, these lugs 24 being adapted to normally rest upon the cooperating lugs 14 which extend inwardly from the flanges 12, the arrangement being such that the grate-like structure 21 is normally maintained in horizontal position and constitutes the bottom of my improved fire basket. An elongated flat lug 25 is provided at the front of the grate-like structure 21 and is of a length sufficient to extend outwardly beyond and beneath the lower edge of front section 3. This lug 25 functions as a means to be hereinafter described, to effect the forward tilting of the grate-like structure 21 about the trunnions 23 and the consequent dumping of the ashes or other contents of the basket.

It is to be noted that the rear, front and end sections which constitute the fire basket or body portion 1 of my improved portable fire basket slope inwardly and downwardly from their top toward their bottom edges, so that the body of the basket is of greater length and greater width at the top than at the bottom thereof. Sections 2, 3, 4 and 5 and also the grate-like structure 21, are preferably made of cast iron, but may be made of other metal and/or by methods other than casting, or may be made of non-metallic material capable of withstanding the temperatures and other conditions incident to the use of such a device. In the manufacture of the fire basket, the lugs 14, 16 and 18 may be cast or otherwise formed integrally with the respective sections, and the trunnions 23 and lug 25 may be cast or otherwise formed integrally with the grate-like structure 21, or, if preferred, these lugs and trunnions may be formed separately and may be attached to the respective parts by means of welding or by the employment of suitable fastening means such as bolts, rivets or the like. As stated, each of the sections 2, 3, 4 and 5, as well as the grate-like sections 21, is cast or otherwise manufactured as a separate unit which permits mass production of the device, and ready and economical packing and shipping of the same from the manufacturer to the dealer or ultimate user. When it is desired to assemble one of the devices to form the fire basket or body portion 1, it is only necessary to select rear and front sections 2 and 3, end sections 4 and 5, and one of the grate-like structures 21. The lugs 18 integral with or secured to the inturned flanges 12 of end sections 4 and 5 are passed through the cut-out portion 9 adjacent each end of the rear and front sections 2 and 3 and the said end sections are moved downwardly within said cut-out portions until the depending portion 19 of each lug engages the outer edges of the flanges 10, there being a slight space 20 between the inner surface of said depending portion 19 and the outer edge of the adjacent flange 10. The apertures in the end sections 4 and 5 are now brought into alinement with the apertures in lugs 16, whereupon a stove bolt or the like 17 is inserted through these alined apertures and the parts or sections are secured together by applying and tightening a nut upon each of the bolts 17. When thus assembled, the parts may partake of slight relative movement, for, as the parts expand and contract under the varying temperatures to which they are subjected, the rear and front sections 2 and 3, respectively, will swing or pivot about the bolts 17, being limited in such movement by the provision of the space 20 above referred to.

In order that the fire basket of my present invention may be readily used as a cooking device or as a barbecue grill, I provide a top or cover for the basket, this top or cover preferably being composed of two separate sections, which sections are identified by the numeral 26 in Figs. 1 and 2 and one of which sections 26 is shown in Fig. 6 of the accompanying drawings. Each section 26 of the top or cover is provided with a plurality of cut-out openings 27 to constitute a grill-like structure adapted to support thereon a suitable cooking utensil or utensils. Each section 26 is also provided with an opening or openings 28 into which may be inserted a suitable tool or implement to assist in placing the section upon, or removing it from, the top of the basket. When in place upon the basket, the sections 26 are supported upon the spaced lugs 8 formed on the bottom wall of channel 6, and the overall dimensions of said sections are such that there is a slight space 29 which extends between the marginal edges of the sections 26 and the adjacent vertical wall of the laterally and outwardly-extending flange 7. By virtue of this construction and arrangement, any grease or liquid which overflows the utensils placed upon the sections 26 will flow over said sections, through the space 29, through the space between the underside of the sectins 26 and the bottom of channel 6, down the inner surface of the fire basket and into the fire within said basket, thus preventing said grease or liquid from running down the outer surface of the basket where its presence would be objectionable and unsightly.

The leg structure by means of which the above described fire basket is supported above a hearth or other surface, constitutes an important feature of my present invention. Specifically, I provide a pair of legs for attachment to the basket at or near each end thereof, these legs including upright, inclined supporting portions 30 and transverse connecting and strengthening portions 31, which last-mentioned portions function to maintain the supporting portions 30 in substantially parallel spaced relation. The upper, inner surface of each upright supporting portion 30 is provided with a relatively flat, inwardly projecting lug 32 of a width corresponding substantially to the width of one of the cut-out portions 9 in the rear and front sections 2 and 3, respectively, of the fire basket. The side edges 33 and 34 of lugs 32 are parallel and are disposed in angular relation to the remainder of the upright supporting portions 30 of each of the legs. It will be noted upon an examination of Figs. 1 and 3 of the accompanying drawings that each pair of legs is inclined upwardly and inwardly from the hearth or other supporting surface toward the ends of the basket 1. This inclined arrangement of the legs at each end of the basket provides an especially rigid support for said basket and prevents the basket from tilting when a force is applied at either end thereof. This inclined positioning of the legs at each end of the basket is made possible by virtue of the angular disposition of the lugs 32 with respect to the remaining portion of each upright supporting portion 30. The distance between the inner faces of each pair of opposed lugs 32 of each pair of legs corresponds substantially to the distance between the inner surfaces of the opposed rear and front walls 2 and 3 at a position adjacent the upper ends of the cut-out portions 9 and is slightly greater than the distance between the outer surfaces of said opposed rear and front sections at a position adjacent the lower ends of the said cut-out portions. Hence it is possible to insert the opposed lugs 32 of each pair of legs past the bottom of the basket 1 and into opposed cut-out portions 9 in the rear and front sections 2 and 3, respectively, preferably into the cut-out portions 9 immediately adjacent the inturned portions 15 at opposite ends of each of said sections. It will be noted upon an examination of the accompanying drawings that the uppermost ends of each pair of legs above the uppermost transverse connecting portion 31 diverge outwardly to correspond substantially to the downwardly sloping rear and front sections 2 and 3, respectively, so that when the legs are in position the outer surfaces of said uppermost ends are substantially flush with the outer surfaces of said sections. Each pair of legs is readily attachable to the basket 1, it merely being necessary to insert the opposed lugs 32 into opposed cut-out portions 9 at the rear and front of the basket and to move said legs or basket until said lugs contact the upper walls defining the tops of said cut-out portions. Instead of the upper ends of the lugs contacting the upper walls defining the tops of said cut-out portions, as above described, the relative widths of the upwardly converging cut-out portions and of the lugs 32 may be such that the lugs engage the upwardly converging walls which define said cut-out portions prior to the time that the tops of the lugs contact the upper walls defining the tops of said cut-out portions. This arrangement will result in a binding of the lugs within the cut-out portions between the upwardly converging walls thereof and will retain the parts in the desired assembled relation. When it is desired to remove the legs from the basket for shipping or storage purposes, it is merely necessary to lift the basket and to force downwardly upon the legs whereupon the lugs 32 will slide downwardly within the cut-out portions 9 and may be readily detached from the basket.

It will thus be seen that I have provided a novel and highly efficient portable fire basket preferably composed of a plurality of individual sections, which fire basket may be readily manufactured, shipped, assembled and secured together to form a fire basket adapted for heating and/or cooking purposes, and that I have provided novel and highly efficient legs which may be readily associated with said basket to support the same and which legs may be readily removed therefrom. It will also be seen that I have provided a fire basket having a novel grate structure by means of which the ashes or other contents of the basket may be readily dumped by mere application of a poker or other implement to a lug on the grate which projects to the exterior of the basket, and without the necessity of inserting a poker or other implement into or through the bed of fire or ashes within the basket. Other important features of my present invention, such as the novel means for fastening the sections together, the novel top or cover structure, etc., are readily apparent from the foregoing description of construction and operation and from the disclosure of the accompanying drawings.

It is to be understood that the form of my invention shown and described herein is to be taken as a preferred embodiment of the same and that various changes may be made in the shape, size and arrangement of parts without departing from the spirit of my invention or from the scope of the subjoined claims.

Having thus described my invention, what I claim is:

1. A portable fire basket including opposed front and rear walls and opposed end walls, the walls of at least one of said pairs of opposed walls including a plurality of upright, spaced apart bars having slots therebetween, and legs for supporting said basket, the upper end of each of said legs entering a slot between two of said bars and engaging the walls defining said slot to support said basket above a hearth or other surface.

2. A portable fire basket including opposed front and rear walls and opposed end walls, the walls of at least one of said pairs of opposed walls including a pluarlity of upright, spaced apart bars having upwardly-extending slots therebetween, and legs for supporting said basket, each of said legs having an inwardly-directed lug at the upper end thereof entering a slot between two of said bars and movable upwardly in said slot to a position where said lug engages the walls defining said slot to support said basket above a hearth or other surface.

3. A portable fire basket including opposed front and rear walls and opposed end walls, the walls of at least one of said pairs of opposed walls including a plurality of upwardly-extending slots defined by spaced, upwardly converging side walls, and legs for supporting said basket, the upper end portion of each of said legs entering one of said slots and movable upwardly in said slot to a position where the upper end portion of said leg engages the upwardly converging side walls thereof at opposite sides of said slot to support said basket above a hearth or other surface.

4. A portable fire basket including opposed front and rear walls and opposed end walls, the walls of at least one of said pairs of opposed walls including a plurality of upwardly-extending slots each defined by a closed upper end wall and spaced side walls, each of said slots having an open lower end, legs for supporting said basket, and an inwardly-directed lug at the upper end of each of said legs adapted to enter one of said slots through the open lower end thereof and to be moved upwardly in said slot to a position where said lug engages the closed upper end wall thereof to support said basket above a hearth or other surface.

5. A portable fire basket including opposed front and rear walls and opposed end walls, the walls of at least one of said pairs of opposed walls including a plurality of spaced elongated, upwardly-extending slots each defined by a closed upper end wall and spaced side walls, legs for supporting said basket, and an inwardly-directed lug at the upper end of each of said legs having substantially vertical, spaced side walls angularly disposed with respect to the remainder of the leg, whereby the lug may enter a slot and engage the walls thereof to support said basket above a hearth or other surface with the remainder of the leg inclined with respect to the vertical.

6. A portable fire basket including opposed front and rear walls and opposed end walls, the walls of at least one of said pairs of opposed walls including a plurality of upright, spaced apart bars having slots therebetween, and two pairs of legs for supporting said basket, one pair at each end of said one pair of opposed walls, each of said pairs of legs including two leg members secured together in substantially parallel, spaced relation, the upper ends of each of the two legs of each pair of legs entering opposed slots in said one pair of opposed walls and engaging the walls defining said slots to support said basket above a hearth or other surface.

7. A portable fire basket as defined in claim 6 wherein the bars have upwardly diverging side walls to define slots therebetween having upwardly converging side walls, and wherein each of the legs of each pair of legs is provided at the upper portion thereof with an inwardly-directed lug of a width between the side walls thereof greater than the minimum width of the upwardly converging slot but less than the maximum width of said slot, whereby the side walls of said lug when the lug is passed into said slot, will engage the upwardly converging side walls thereof to support the basket above a hearth or other surface.

8. A portable fire basket as defined in claim 6 wherein the upper end of each of the legs of each pair of legs is provided with an inwardly-directed lug having spaced, substantially vertical side walls angularly disposed with respect to the remainder of the leg, whereby the lugs may be disposed within the slots with the remainder of each leg inclined with respect to the vertical.

MORRIS H. GARFUNKLE.

REFERENCES CITED

The following references are of record in the file of this patent:

UNITED STATES PATENTS

| Number | Name | Date |
| --- | --- | --- |
| 115,590 | Flood et al. | June 6, 1871 |
| 153,655 | Withers | July 28, 1874 |
| 324,102 | Friedrich et al. | Aug. 11, 1885 |
| 418,810 | Musick | Jan. 7, 1890 |
| 766,702 | Knight | Aug. 2, 1904 |
| 1,164,714 | Gronlund | Dec. 21, 1915 |
| 1,165,116 | Neuman | Dec. 21, 1915 |
| 1,336,766 | Ward et al. | Apr. 13, 1920 |
| 1,385,931 | Semonin | July 26, 1921 |
| 1,548,410 | Derbyshire | Aug. 4, 1925 |
| 2,158,805 | Smith | May 16, 1939 |
| 2,314,791 | Jones et al. | Mar. 23, 1943 |